March 21, 1967    L. SOSOWER    3,310,173
APPARATUS FOR REMOVING SEDIMENT FROM SWIMMING POOLS
Filed Nov. 4, 1963
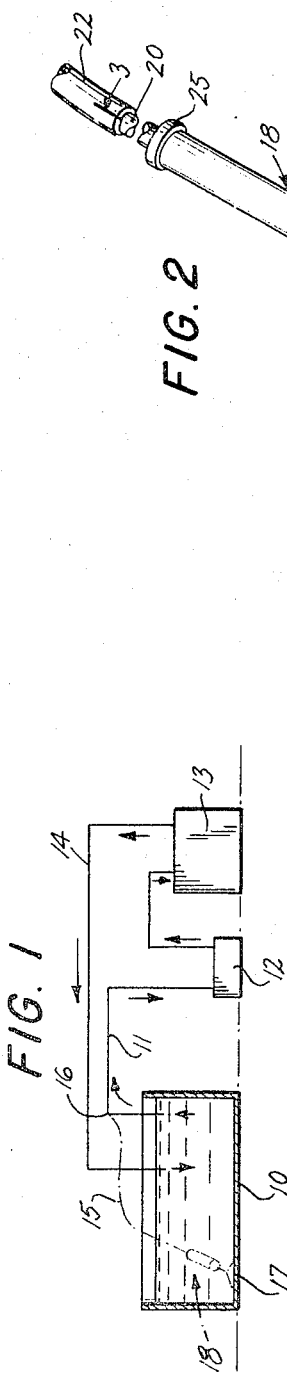
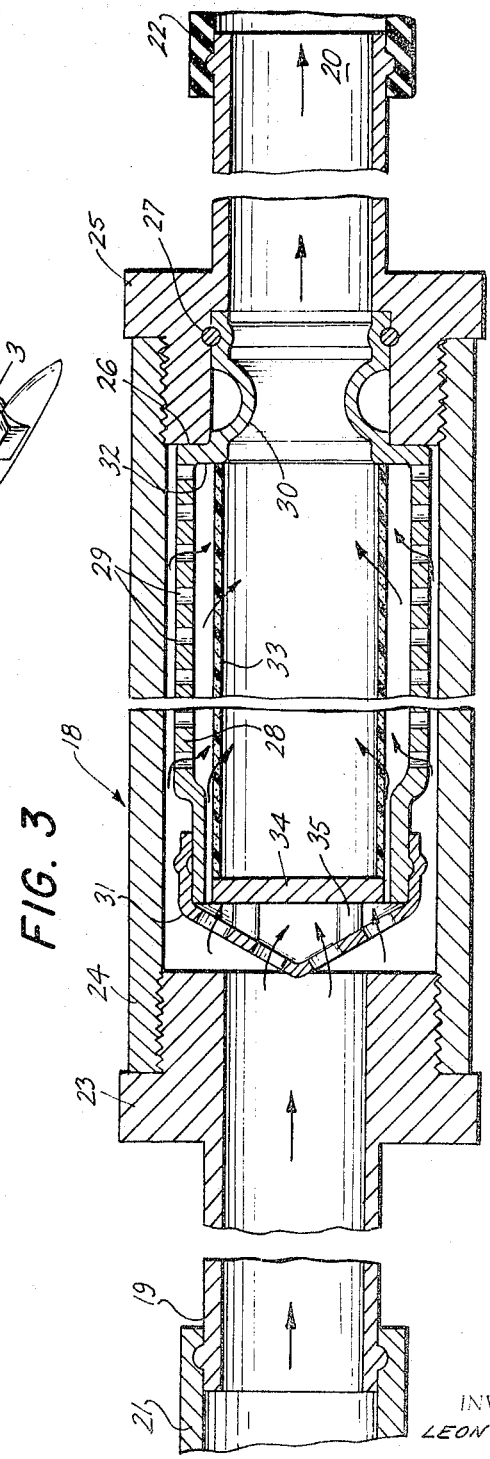
INVENTOR:
LEON SOSOWER
BY
Frederick Breitenfeld
ATTORNEY

United States Patent Office 3,310,173
Patented Mar. 21, 1967

3,310,173
APPARATUS FOR REMOVING SEDIMENT FROM SWIMMING POOLS
Leon Sosower, Teaneck, N.J., assignor to Tri-Men Mfg. Corp., Hoboken, N.J., a corporation of New Jersey
Filed Nov. 4, 1963, Ser. No. 321,200
2 Claims. (Cl. 210—169)

The present invention relates generally to swimming pools, and has particular reference to improved apparatus for periodically removing sediment from the floor of a pool.

In swimming pool installations it is common practice to employ a filtration circulating system whereby the pool water is continuously sucked from the pool by a pump, directed by the pump to and through a main filter, and returned to the pool. Usually the filtering medium is of a kind which intercepts all particles larger than about 5 microns, after most of the bulkier items, such as leaves, have been held back by appropriate strainers at the suction end of the system at the pool itself. The filter leaf or cylinder employed is relatively large and unwieldy, and while it is removable for cleaning or replacement the operation is rather cumbersome and is feasible only at relatively infrequent intervals.

It is desirable at much more frequent intervals, perhaps even daily, to remove relatively coarse sand and sediment from the floor of the pool. For this purpose a hose or conduit can be connected to the suction side of the pump, and with a suction or vacuum head at its free end it can be manipulated like an ordinary household vacuum cleaner to pick up the sediment that is to be removed. This imposes a considerable load upon the filter, and leads either to premature clogging of the filtering medium, or to the necessity for undesirably frequent time-consuming and expensive filter replacement procedures.

It is a general object of this invention to provide an improved apparatus by means of which undesired sediment can be "vacuumed" inexpensively, simply, and as often as may be desired, without any dependence upon the main filter for interception of the particles sought to be removed. This objective is attained without any alteration of existing installations, and without any material modification of customary practices.

This object can be attained, in accordance with this invention, by providing a novel type of filter unit that can be inexpensively manufactured, and furnished as an attachment or accessory for conventional pool-purifying installations, the unit being insertable into the existing hose or conduit by means of which the vacuuming of the pool is customarily carried out. Or, if desired, the filter unit can be manufactured as part of such a hose or conduit and the entire apparatus furnished as a pool-cleaning accessory.

A feature of the invention resides in making the filter unit of light-weight, low-cost materials, and incorporating with it a readily replaceable inexpensive filter cartridge of small size, easy to handle. In this way, frequent cartridge replacement is a simple and expeditious matter.

The new filter unit is not intended as a replacement for the main filter. It preferably embodies a filter medium which will merely intercept only the relatively coarse sediment periodically sought to be removed from the floor of the pool. In doing so, it conditions the water pumped to the main filter and avoids loading the main filter with such sediment. Thus it extends the operability of the main filter and minimizes the necessity for too-frequent main filter-leaf replenishment.

A preferred embodiment of the invention is illustrated in the accompanying drawings, in which:

FIGURE 1 is a diagram of conventional pool filtering equipment;

FIGURE 2 is a perspective view of a filter unit of the present novel character, showing its operative relation to a vacuuming conduit; and FIGURE 3 is an enlarged cross-sectional view along the line 3—3 of FIGURE 2.

From the swimming pool 10 shown in FIGURE 1, a pipe or conduit 11 leads to a vacuum pump 12, and from there the water is pumped to and through a main filter 13 from which it returns to the pool via pipe-line 14. The main filter may be of any conventional kind adapted to function continuously, or at least for selected protracted durations, to filter out impurities down to about 5 microns.

At the inlet end of pipe 11 a strainer is usually provided, to prevent leaves and similar large matter from entering the pump system.

When it is desired to remove sediment from the floor of the pool, a manipulable hose or conduit 15 is connected to the suction line, as indicated at 16, its free end carrying a suction or vacuum head 17 (see FIGURE 2) of any desired or suitable shape. By maneuvering the head 17 along the floor of the pool sediment in suspended condition is sucked out and transported to the pump 12. In ordinary installations this suspension is directed by the pump 12 to the main filter 13 where the sediment is filtered out and quickly clogs the fine pores of the main filtering medium.

The present invention aims to interpose a filter unit, designated by the general reference numeral 18, in the vacuum line 15. For this purpose the unit 18 is provided with connection pipes 19 and 20 at its opposite ends, to which connections 21 and 22 can be made by any desired type of conventional coupling means. The pipes 19, 20 may be of any desired lengths. The connection 19, leading to the vacuum head 17 is rigid. The connector 20 may also be rigid and serves as a handle for manipulation of the device; but if the connector 19 is made long enough the filter unit 18 may itself serve as a handle, in which case the connecting pipe 20 may be flexible, if desired.

While the invention does not require that any specific dimensional relationships exist, its general nature will be better understood if it is pointed out that, by way of example, a satisfactory and practical apparatus has been used in which the unit 18 is about 1 foot or less in length and about 2½ inches in diameter.

The unit 18 consists essentially of a housing within which a filtering device is accommodated in readily replaceable fashion. The housing chosen for illustration is generally cylindrical and comprises separable interengaging elements 23, 24, and 25 defining an outer casing when joined together. The elements may be composed of rigid inexpensive plastic, if desired. The element 24 is a tube having internally threaded opposite ends. The element 23 can be a flanged externally threaded rear end on the connector pipe 19, and the element 25 can be a similar flanged externally threaded front end on the connector pipe 20. The front end of element 25 defines a forwardly directed shoulder 26 on the interior of the outer casing.

For a purpose to be described, the inner surface of the element 25 is preferably provided with an annular springy detent 27.

Within the outer casing is a perforated inner cage spaced from it and adapted to accommodate a filtering cartridge. The cage shown comprises a cylindrical body and a perforated cap. The body has a relatively large section 28 at its forward end, provided with perforations 29, and a relatively small unperforated section 30 at its rear end. On its outer surface the section 30 is provided with an annular groove adapted to cooperate with the detent ring 27 for frictionally securing the small section 30 to the outer casing. The cap 31 is removably applicable to the front end of the section 28, preferably held in position by a simple springy separable frictional engagement. The cap is advantageously somewhat cone-shaped as shown, the apex extending forwardly.

Between the sections 28 and 30 of the cage body is an annular area whose outer surface rests against the shoulder 26 and whose inner surface defines a forwardly directed shoulder 32.

The cage can also be composed of inexpensive plastic, if desired.

The filter cartridge is insertable into the cage through the front end when the cap 31 is removed. It consists of a tubular body 33 of suitable filtering material, and it is of such size that its rear end bears against the shoulder 32 while its front end (closed by a disc 34) lies directly behind the cap 31. The cap 31 may be provided with projecting parts 35 (or other equivalent means) for bearing against the closure disc 34 and pressing the cartridge rearwardly against the shoulder 32.

The cylindrical part of the cartridge is of less diameter than that of the perforated section 28 of the cage, and is spaced therefrom as shown. The filtering medium may be of any desired kind, preferably a self-sustaining mat or body of fiber glass or the like, about ⅛ to ¼ inch in thickness. The medium chosen should preferably intercept only particles of matter larger than 100 microns or so, and it is preferably of an inexpensive kind to permit the cartridge to be feasibly discarded and replaced in its entirety when its usefulness has ended.

With the parts assembled as shown in FIGURE 3, the apparatus is in readiness for removal of sediment from the pool. By the procedure previously described, water carrying suspended particles is caused to pass through the filter unit 18. As illustrated, the water flows from left to right as indicated by the arrows. After passing through the perforated cage it is constrained to flow inwardly through the tubular body of the filtering cartridge, and in doing so it deposits the intercepted suspended matter on the outer surface of the cartridge. The conditioned water then continues on its regular circulatory path to and through the pump and main filter.

As frequently as may be necessary or desirable, the cartridge can be readily replaced. To accomplish this the outer casing is opened, by disengaging one or both elements 23, 25 from the element 24, and the cap 31 is removed from the perforated cage. This makes the filter cartridge accessible for withdrawal, and a replacement cartridge can be quickly introduced and clamped into operative position in the same way.

The improved apparatus is thus of inexpensive practical character, readily usuable with existing installations, and effective to safeguard the main filter of a swimming pool filtration system from premature clogging or impairment by pool-vacuuming procedures, regardless of the frequency with which such removal of sediment is carried out.

In general, it is to be understood that the details herein described and illustrated can be modified in numerous respects without necessarily departing from the spirit and scope of the invention as expressed in the appended claims.

What is claimed is:

1. In a swimming pool filtration circulating system in which water is continuously sucked from the pool, directed through a main filter, and returned to the pool: an apparatus for removing sediment from the floor of the pool, comprising a readily manipulable conduit connectable to the suction side of the circulating system, a vacuum head at the free end of said conduit, a filtering unit forming part of said conduit and adapted to intercept said sediment, whereby said sediment removal can be carried out periodically without dependence upon said main filter for interception of said sediment, said filtering unit comprising a housing including interengaging but readily separable elements defining an outer casing when joined together, a perforated inner cage within said casing and spaced from the casing wall, and a replaceable filtering cartridge mounted within said housing, said cage comprising a cylindrical body having a relatively large perforated section at one end, a relatively small unperforated section at the other end, an inner shoulder between said sections, a perforated cap removably applicable to the end of said perforated section, and means for frictionally securing the small section to the outer casing, said cartridge being insertable into said cage through said larger section when the cap is removed therefrom.

2. A sediment removing apparatus as defined in claim 1, wherein said cartridge comprises a tubular body of filtering material smaller in diameter than the larger section of said cage, one end of said tubular body bearing against said inner shoulder, the other end of said tubular body being closed; and wherein said perforated cage cap is provided with means for engaging said closed end of the cartridge to press the latter against said shoulder and thus retain it in operative disposition within said cage.

References Cited by the Examiner

UNITED STATES PATENTS

| | | | |
|---|---|---|---|
| 1,516,359 | 11/1924 | Tideman. | |
| 2,701,235 | 2/1955 | King | 210—169 X |
| 3,012,676 | 12/1961 | Englesberg | 210—169 X |
| 3,039,122 | 6/1962 | Birdsall | 15—1.7 |
| 3,132,364 | 5/1964 | Oxley | 15—1.7 |
| 3,186,550 | 6/1965 | Beduhn | 210—169 |

REUBEN FRIEDMAN, *Primary Examiner.*

F. W. MEDLEY, *Assistant Examiner.*